United States Patent [19]

Markis

[11] Patent Number: 4,850,232

[45] Date of Patent: Jul. 25, 1989

[54] SYSTEM FOR MEASURING THE DIMENSIONS OF A WORKPIECE

[75] Inventor: William R. Markis, Rochester, N.Y.

[73] Assignee: Eastman Kodak Company, Rochester, N.Y.

[21] Appl. No.: 181,997

[22] Filed: Apr. 15, 1988

[51] Int. Cl.[4] ...................... G01B 17/00; G01B 21/02; G01B 21/06

[52] U.S. Cl. ...................................... 73/865.8; 73/1 J; 73/619; 73/641

[58] Field of Search ........................ 73/1 J, 865.8, 159, 73/625, 626, 641, 618, 619; 356/379, 380, 381, 383, 386, 387

[56] References Cited

U.S. PATENT DOCUMENTS

| | | | |
|---|---|---|---|
| 3,513,444 | 5/1970 | Henderson et al. | 364/900 |
| 3,588,480 | 6/1971 | Unger et al. | 364/567 X |
| 3,603,680 | 9/1971 | Barton | 355/3 |
| 3,806,253 | 4/1974 | Denton | 356/386 |
| 3,944,963 | 3/1976 | Hively | 73/626 X |
| 4,192,613 | 3/1980 | Hammar | 356/386 |
| 4,354,388 | 10/1982 | Diepers et al. | 73/612 |
| 4,413,518 | 11/1983 | Jones | 73/615 |
| 4,494,841 | 1/1985 | Marcus | 354/21 |
| 4,511,998 | 4/1985 | Kanda et al. | 367/11 |
| 4,513,404 | 4/1985 | Huggins | 367/93 |
| 4,620,781 | 11/1986 | Miyamoto | 355/3 R |
| 4,698,996 | 10/1987 | Kreft et al. | 73/1 J |
| 4,773,029 | 9/1988 | Clebsson et al. | 356/380 X |

*Primary Examiner*—Tom P. Noland
*Attorney, Agent, or Firm*—Robert H. Sproule

[57] ABSTRACT

One or more dimensions of a workpiece, such as sheet material, are determined by passing the material between opposing linear arrays of ultrasonic transmitting and receiving transducers. The dimension of the sheet material is a function of the number of receiving transducers which receive a transmitted signal as compared to the number of receiving transducers which no longer receive a transmitted signal due to blockage of the signal by the sheet material. The strength of the signal is a function of the amount the receiving transducer is blocked by the workpiece, which in turn is a function of the position of an edge of the workpiece relative to the receiving transducer. A more accurate determination of the workpiece dimensions is obtained by establishing various threshold levels of signal strength and by comparing the receiver signal to these threshold levels. In order to compensate for differences in receiver output due to differences between individual transducers, a correction offset for each receiver signal output is measured when the workpiece is not present, and the correction offsets are later added to the corresponding receiver outputs which are generated when the workpiece is present.

8 Claims, 6 Drawing Sheets

TO THRESHOLDING CIRCUIT
FROM GATE 28

EN
UP
COUNTER
CLK
OE
MEMORY
OE
WE
DAC
FROM PEAK DETECTOR
FROM MUX ADDRESS GENERATOR 24
D
F/F
CLK
Q
EOL
POWER UP
SHIFT REGISTER DELAY
P/S
CLOCK
43
49
53
57
59
60
61
63
71
72
78
80
82
84
86
88
89
90

SYSTEM FOR MEASURING THE DIMENSIONS OF A WORKPIECE

TECHNICAL FIELD

The present invention relates to a system which utilizes transmitted energy, such as ultrasonic energy, to measure one or more dimensions of a workpiece, such as sheet material.

BACKGROUND OF THE INVENTION

Conventional processors for developing exposed X-ray film have been known to use an optical scanner system to determine the length and width of the film before it is transported through the processor. Typically, this size information is used to adjust the input of fresh chemicals into the processor, as well as to sort the exposed film according to size.

One processor is known to use an array of infrared transmitting diodes to scan the film. Located opposite from the transmitting diodes are a lesser number of infrared detecting diodes. When the film is transmitted between the transmitting and detecting arrays, some of the infrared light is blocked from reaching the detector diodes. This information can be used to adjust the replenishment rate of chemicals into the processor.

A problem in using an infrared measurement system is that some of the newer X-ray films exhibit sensitivity in the infrared region. Thus when these films are exposed to infrared energy, the film becomes "fogged" thereby obscuring the developed image.

Conventionally, a number of detection systems have been disclosed. For example, in U.S. Pat. No. 3,603,680 by Barton, there is disclosed an ultrasonic paper detection system which utilizes a plurality of transmitter and receiver transducers to generate timing signals when the sonic path therebetween is interrupted by the travel of paper.

Kanda et al, in U.S. Pat. No. 4,511,998, discloses an acoustic imaging instrument which includes opposing arrays of acoustic transducer elements and acoustic detecting elements.

In U.S. Pat. No. 4,513,404 by Huggins an acoustic system for detecting the presence or absence of paper includes a receiver which detects a change in the acoustic impedance of a receiving port when the paper is absent or in close proximity to the port.

Furthermore, Miyamoto in U.S. Pat. No. 4,620,781, discloses an image processing system which includes a photosensor for detecting the size of an original document.

And also, in U.S. Pat. No. 4,494,841 by Marcus, which is assiged to the assignee of the present invention, there is disclosed an acoustic position sensing apparatus which is utilized to sense the position of an object relative to a sensing port in an acoustic resonator.

SUMMARY OF THE INVENTION

The present invention pertains to apparatus for determining one or more dimensions of a workpiece. The apparatus includes energy measuring means having i) a plurality of transmitters of energy, and ii) a plurality of receivers of that energy. The transmitters are separated from the receivers in order to pass the workpiece between them in a manner that the energy to at least one of the receivers is obstructed by the workpiece. Each of the receivers generates an output which is a function of the energy received from the transmitters. The present invention also includes means, responsive to the output, for determining the dimension of the workpiece as a function of the number of receivers which receive energy from the transmitters.

BRIEF DESCRIPTION OF THE DRAWINGS

These and other features of the present invention will become more readily apparent upon reading the following detailed description in conjunction with the attached drawings, in which:

FIG. 1 is a side view of opposing arrays of transmitting and receiving sonic transducers for measuring the dimensions of a sheet material located there between;

DETAILED DESCRIPTION OF THE INVENTION

Figure 1:
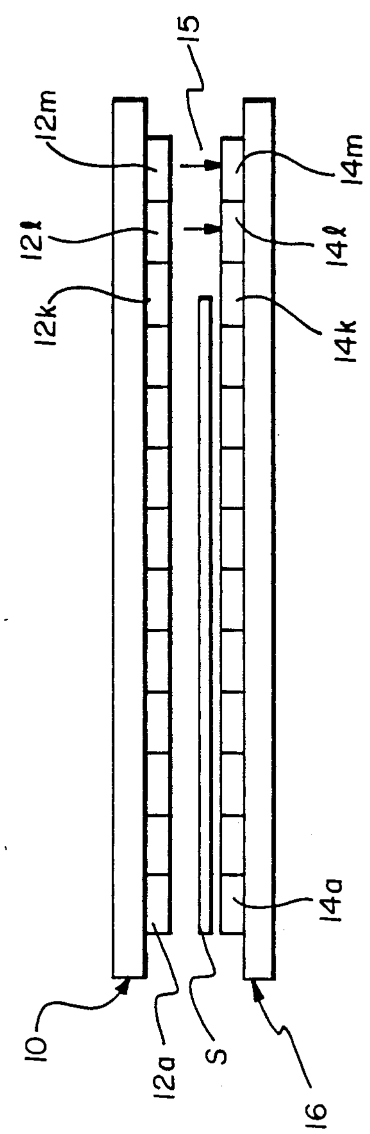

To provide a broad overview of the present invention, there is shown in FIG. 1 a row of ultrasonic transmitting transducers which are spaced apart from a row of receiving transducers. As a workpiece, such as a piece of sheet material, is transported between these transducers in a manner perpendicular to the lengthwise axes of the transducer rows, the signals to some of the receiving transducers are blocked. The number of transducers receiving these transmitted signals is compared to the number not receiving the transmitted signals, and these values are used to calculate a sheet width value. In addition, the length of each sheet is determined by measuring the time differential between the first interruption of the transmitted signals and the last interruption, and by multiplying this time differential by the known transit speed of the sheet material.

Figure 2:
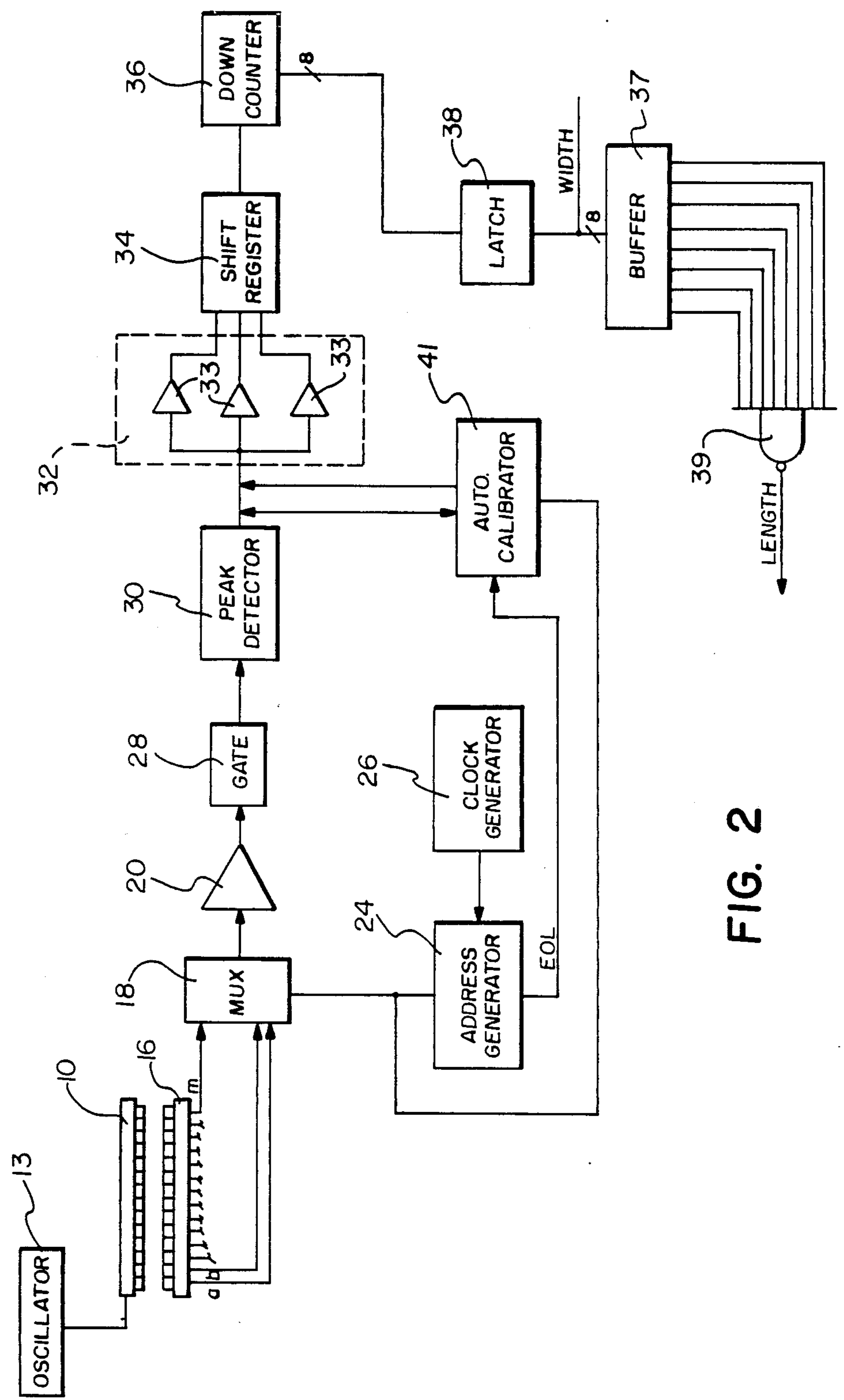
FIG. 2 is a simplified diagram of an exemplary measurement system of the present invention.

To expand upon this overview, reference is made to FIGS. 1 and 2 where there is shown a linear array indicated at 10 of ultrasonic transmitting transducers **12*a* through 12*m* which are driven by an oscillator/driver 13, and which are spaced apart from a like number of receiving transducers 14*a* through 14 m which are part of a linear array indicated at 16. As shown in FIG. 1, the transducers 12*a* through 12*m* are positioned in a linear side-by-side manner, as are the transducers 14*a* through 14 m. In an exemplary embodiment, the transducers are ceramic transducers, model EFR-RSB-40K manufactured by Panasonic; the transmitting transducers being spaced apart from the receiving transducers across a gap 15 a distance of approximately one half an inch. In the present embodiment, sheet material S having a width dimension w, is transported by a conveyor (not shown) between the arrays 10, 16 and in a direction which is perpendicular to the plane of FIG. 1. In FIG. 1 it can be seen that the signals from transmitting transducers 12*a* through 12*k* are blocked by the sheet material S from reaching the receiving transducers, while the signals to transducers 14l and 14 m remain unblocked. By calculating the ratio of the number of receiving transducers which do not receive a signal, to the total number of receiving transducers, as well as determining the distance between receiving transducers 14***a* and 14 m, the width of the sheet material can be determined in a conventional manner.

In order to read the signals generated by each of the receiving transducers 14 (also referred to herein as "receivers'), a conventional time multiplexer 18 (FIG. 2) is provided. Multiplexer 18 reads the receiving transducer outputs sequentially, from 14*a* through 14 m, in two millisecond intervals, and feeds these signals to a downstream amplifier 20. The multiplexer 18 is addressed by a MUX address generator 24 which in turn is clocked by a conventional clock generator 26. In an exemplary embodiment, the address generator 24 is a five bit counter and the clock generator is a phase locked loop IC operating at 500 Hz.

The amplifier 20, in providing about 55 dB of gain, increases the noise level resulting from multiplexer switching transients. In order to remove this noise which is particularly prevalent at the beginning and at the end of each receiver output, the amplified output is fed through a gate 28 which is open only during the middle one millisecond of each receiver output. In this manner, a majority of the noise which is present at the beginning and end of each receiver output is gated out. This allows about forty cycles of the receiving transducer signal to be fed downstream to a peak detector 30 which generates an output which is equal to the peak value of each signal. The output of the peak detector is a signal of slightly less than one millisecond duration; this signal having an amplitude which is proportional to the output of the addressed receiving transducer.

It should be appreciated that accuracy of the width measurement is somewhat constrained by the diameter of each transducer. For example, in FIG. 1 the receiving transducer 14*k* is only partially blocked by the sheet material. If the number of fully blocked or partially blocked receiving transducers is used to determine sheet width, there may be some inaccuracy. That is, unless the transducers are overlapped, the measurement cannot be any more accurate than the diameter of each transducer. Overlapping the transducers, however, increases their number. In the present invention to provide the required measurement accuracy without having to increase the number of transducers, each receiver signal is thresholded to three levels set at a thresholding circuit 32 (FIG. 2). That is, as the sheet material begins to pass between a transmitter and receiver pair, the percentage of the signal reaching the receiver decreases. Furthermore, this decrease in the signal strength is directly proportional to the extent that the receiving transducer is blocked by the sheet material. In the present invention, this proportionality is used to determine the position of the sheet material between adjacent receiving transducers in order to provide a more accurate measurement of sheet material width.

In order to accomplish this, the thresholding circuit 32 includes three comparators 33 (FIG. 2) which are utilized to establish three threshold levels. For example, the amplifier gain is set so that when the sheet material is absent from the transducer gap, the resulting maximum voltage is equal to ten volts. To determine the extent to which the transducer is blocked by the sheet material, the comparators are set to switch at 2.5 V, 5.0 V, and 7.5 V. These levels correspond to the transducer being 75%, 50% and 25% blocked, respectivey, by the sheet material. In this example there is a twenty dB difference between the voltage output when the transducer is fully blocked and totally unblocked, with the fully blocked voltage being around one volt. In order to provide an output indicative of the threshold level, the combined outputs of the comparators generate a three bit binary code which represents the signal level at the thresholder for each receiver output. In this manner, a threshold output of 111 corresponds to a completely unblocked receiver, while an output of 000 corresponds to a completely blocked receiver. By knowing the percentage of the transducer that is blocked by the sheet material as well as the diameter of the transducer, the location of the edge of the sheet material with respect to the transducer can be more accurately calculated. In an exemplary embodiment, the percentage of obstruction as a function of the output codes is set forth in further detail in Table 1 below.

TABLE 1

| Bit A | Bit B | Bit C | % Obstr. | Binary Code |
|---|---|---|---|---|
| 0 | 0 | 0 | 75–100 | 00 |
| 0 | 0 | 1 | 50–75 | 01 |
| 0 | 1 | 1 | 25–50 | 10 |
| 1 | 1 | 1 | 0–25 | 11 |

The three bit threshold code (bits A, B, C) is fed downstream to a shift register 34 in a manner that the number of logic high bits of the code generates a corresponding number of low-to-high transitions out of the shift register which are then used to clock a downstream down counter 36.

In order to determine the width of the sheet material, the counter 36 is jammed with a number that is equal to the number of receiving transducers multiplied by three (e.g. $3\times13=39$); the number "three" representing the three threshold levels. If there is no sheet material blocking any of the receivers, then a total of thirty nine clocking pulses are fed from the shift register 34 to the counter 36, and the counter is counted down from thirty nine to zero. On the other hand, the presence of any sheet material in the gap will produce a lesser number of clocking pulses, which in turn will count down the counter so that the remaining count is proportional to the width of the sheet material. At the end of every line, i.e. after reading all of the receiving transducers once, the resulting counter output is held in a downstream latch 38 and the counter 36 is reset. This reset occurs in response to a carryout pulse which is generated from the multiplexer address generator 24 after all of the receivers have been read. The latched value is a seven bit number which represents the width of the sheet material. This binary number is converted in a conventional manner into an arithmetic quantity at a downstream location.

In order to determine the length of the sheet material, an octal inverting buffer 37 is tied to the output of latch 38. In turn, the output of the buffer 37 is fed to a multiple input NAND gate 39 When any of the bits from latch 38 go high indicating the presence of sheet material in the gap, at least one of the outputs from the buffer 37 goes low. This generates a logic high out of the gate 39 which remains high as long as sheet material is present in the gap. Using this information along with the transit speed of the sheet material, the length of the sheet material is calculated in a conventional manner at a downstream location.

Figure 3:
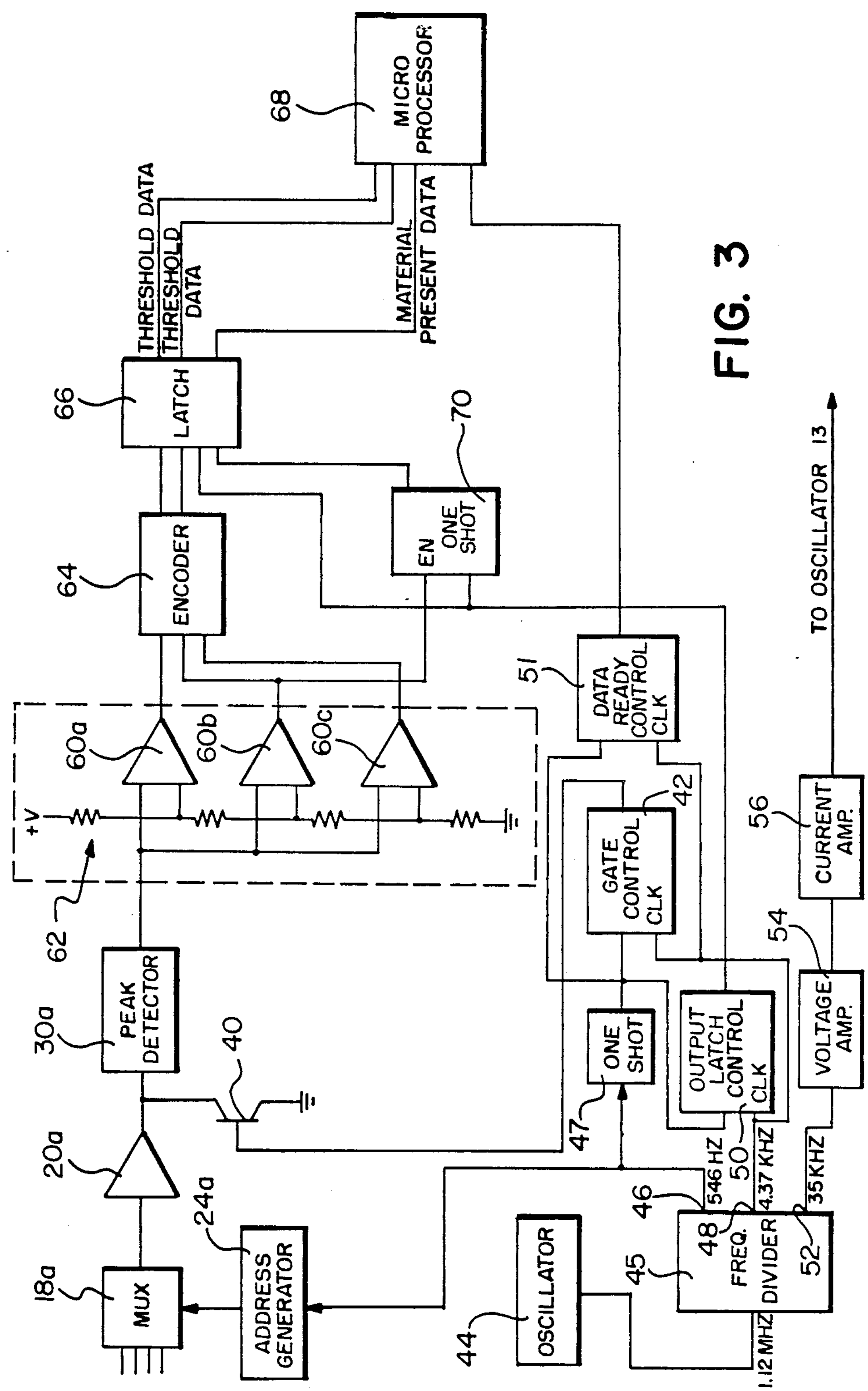
FIG. 3 is a simplified diagram of another exemplary measurement system of the present invention.

In an alternate embodiment shown in FIG. 3, like elements described in the previous embodiment are designated by like numerals with the suffix "a" attached. In this embodiment the incoming signals from the receiving transducers are selected in a sequential manner by the multiplexer 18*a* and boosted by a number of downstream amplifiers identified by the number 20*a*. The center portion of each receiver signal is gated by a transistor 40 which has its base tied to the output of a gate controller 42.

Clocking pulses to the gate controller 42 are generated by a 1.12 Mhz oscillator 44 whose output is divided down by a frequency divider 45 into a number of different clock frequencies. For example, a 546 Hz output is generated at an output 46 for clocking the MUX address generator 24*a* as well as for triggering a one shot multivibrator 47. In addition, a 4.37 Khz signal is generated at an output 48 of the frequency divider for clocking a output latch controller 50, as well as for clocking a data ready latch controller 51, and the gate controller 42. Furthermore, a 35 Khz signal is generated at an output 52 of the frequency divider for driving the transmitting transducer oscillator 13 (FIG. 1) via a voltage amp 54 and current amp 56.

Figure 4:
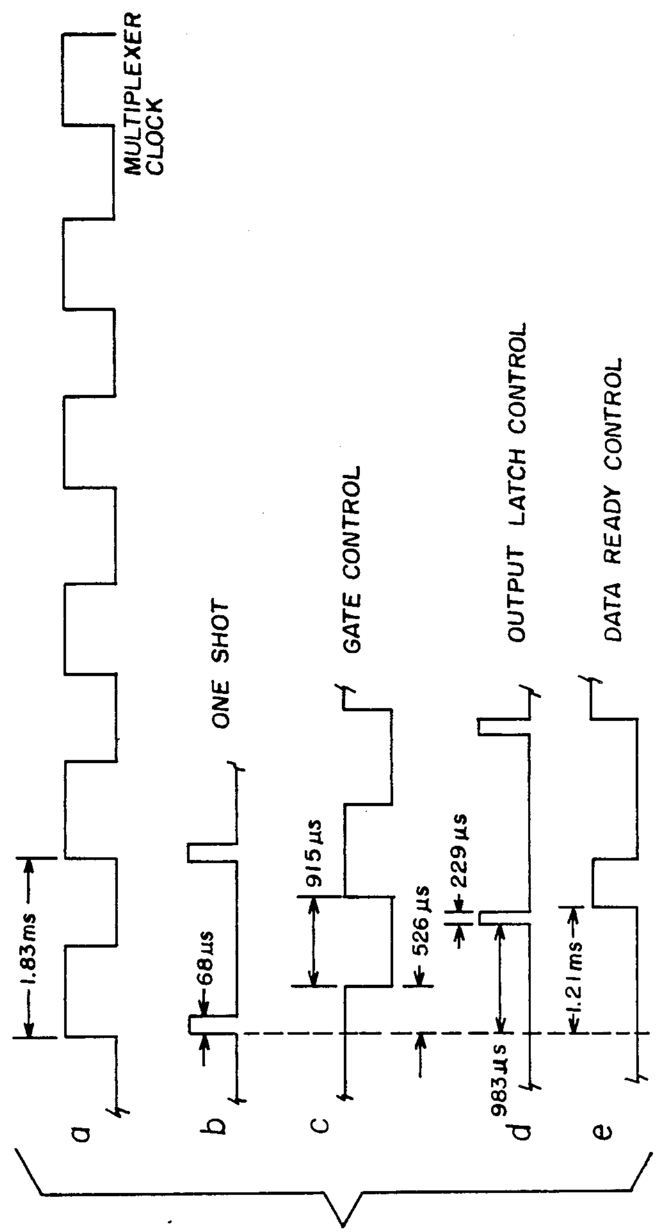
FIG. 4 is a diagram of the timing signals generated by the circuit shown in FIG. 3.

Continuing with the description of the gating function, reference is made to the timing diagram of FIG. 4 which is not drawn to scale. The rising edges of the aforementioned 546 Hz clock signal shown in line "a" of FIG. 4 trigger the one shot multivibrator 47 (FIG. 3) to generate the signal shown in line "b" of FIG. 4. The one shot simultaneously pulses the gate control 42, the output latch control 50 and the data ready control 51 so that the parallel data at their inputs is read in; this data being clocked out serially when the one shot pulse terminates. In the present embodiment, the gate control 42 is a shift register having eight parallel inputs which are hardwired to clock out the bit pattern 11000011 at a 4.37 Khz rate in order to generate the pulse train which is shown at line "c" of FIG. 4. When the gating signal is low, it turns off the gating transistor 40 (FIG. 3) which permits the middle portion of the signal to be fed to the peak detector 30*a*. As shown by the timing diagram of FIG. 4, the gate (line c) is open only during the middle portion of each multiplexer clock cycle (line a). In this manner, the gating function is achieved by permitting only the middle portion of each cycle from the multiplexer 18*a* to proceed downstream to the peak detector 30*a* from where it is fed to the thresholding circuit.

In this embodiment of the present invention, the thresholding circuit includes three comparators 60*a*, 60*b*, and 60*c* (FIG. 3), each of which has one input tied to the output of the peak detector 30*a*. The remaining inputs of these comparators are tied to a voltage divider indicated at 62 which sets the switching levels of the comparators so that comparator 60*c* switches at 1/4 the supply voltage level (+V), comparator 60*b* switches at ½ of +V, and comparator 60*a* switches a 3/4 of +V. In this manner, if a maximum level signal appears at the inputs to the comparators (indicating no blockage of the transducer port by the sheet material), the outputs of the comparators are all logic one's. On the other hand, if there is total blockage of the addressed receiving transducer, then all three comparators switch and their output is all zeroes. However, partial blockage of the transducer will cause one or more of the comparators to switch, generating a combination of logic one's and zeroes as discussed in the previous embodiment.

In order to encode the three comparator outputs into a two bit binary number shown in Table 1, these outputs are fed downstream to an encoder 64. The resulting binary code is then stored in a downstream latch 66 where it is retrieved by a general purpose microprocessor 68 which totals the binary count after all receiving transducers have been read, and converts this count into a width measurement by accessing a lookup table in the microprocessor 68.

In order to latch the encode output at the proper time, the output latch control 50 (FIG. 3) includes a conventional shift register which is enabled by the one shot multivibrator 47, and which is clocked by the 4.37 Khz clock. The signal output from latch 50 (shown in line "d" of FIG. 4) is generated by hardwiring the eight parallel inputs of the shift register to generate the following serial output: 000010000. The rising edge of the output latch control pulse occurs during the latter half of the gating pulse shown in line "c", in order to latch the output of encoder 64. In order to notify the microprocessor 68 that the latched data is ready for retrieval, the data ready control 51 includes a shift register which has eight hardwired parallel inputs to generate the following binary output: 00000111. Since the shift register is also clocked at a 4.37 Khz rate, and since it is enabled by the rising edge of the one shot pulse, the data ready control pulse occurs just after the termination of the latch control pulse as shown in line "e" of FIG. 4.

In the present embodiment, the length dimension of the sheet material is determined by a signal to the microprocessor 68 (FIG. 3) which indicates when the sheet material is present in the gap between the transmitting and receiving transducers. This signal is generated by utilizing a retriggerable one shot multivibrator 70 which is enabled by the output of the middle threshold comparator 60*d* whenever there is sheet material present. The one shot 70 is triggered and retriggered by the signal from the output latch controller 50 so that a "material present" signal is generated as long as sheet material is in the gap. This signal is held at the latch 66 where it is retrieved by the microprocessor 68.

In a further exemplary embodiment, the measurement system includes an automatic calibration circuit 40 (FIG. 2) which is provided to correct for variations in the operation of the individual transmitting and receiving transducers 16. More specifically, the calibration circuit 41 normalizes the variations in signal strength out of the receiver transducers which are primarily due to variations between the drive frequency, transmitting transducer frequency, and receiving transducer frequency. These variations can affect the measurement accuracy of the system.

Figure 5:
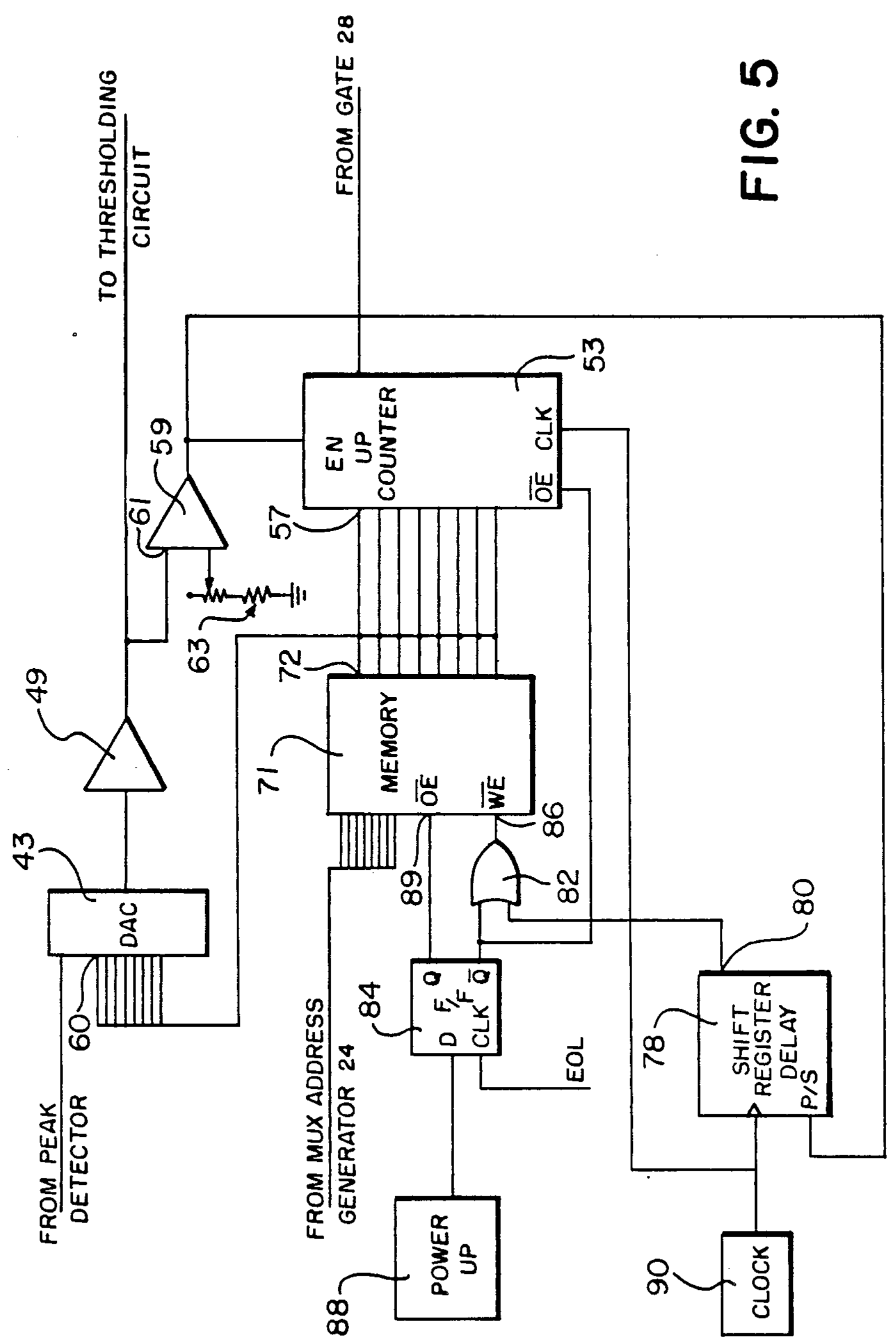
FIG. 5 is a simplified diagram of an automatic calibration circuit which is used in an exemplary embodiment of the present invention.

In order to describe the automatic calibration circuit in more detail, reference is made to FIG. 5 where there is shown a multiplying digital-to-analog converter 43 followed by an amplifier 49. The purposes of the DAC 43 and amplifier 49 are to act together as a variable gain unit to compensate for the aforementioned variations between transducers. The amount of compensation per receiver is determined in a powerup calibration sequence when sheet material is absent from the gap. That is, during this time a calculation is made of the amount by which each receiver output varies from a reference level; this amount constituting a correction value for each receiver output. Then when the sheet material is present in the gap, and the various receiver outputs are sequentially accessed by the multiplexer 18 (FIG. 2), the corresponding correction value adjusts the output from the accessed receiver.

Figure 6:
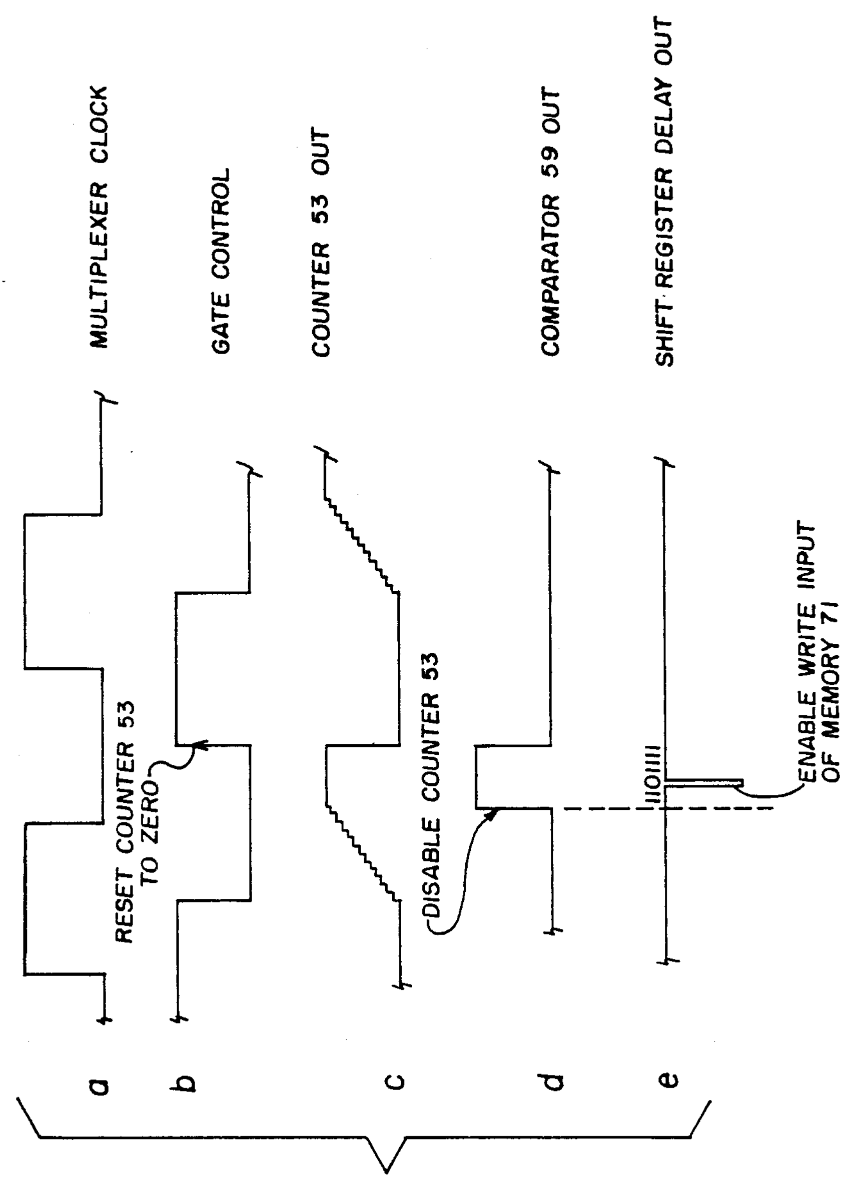
FIG. 6 is a diagram of timing signals generated by the calibration circuit when in a calibration mode.

The correction values for each receiver are determined in the power-up calibration mode by means of an up counter 53 which counts up from zero to the reference value. In order to establish the reference level, the up counter 53 is enabled by a comparator 59 which has one input 61 tied to the output of the amplifier 49, and which has its other input tied to a voltage divider 63 which sets the switching level of the comparator 59. As long as the output from amplifier 49 is below the switching level, the counter 53 is enabled and it counts up linearly as shown by line "c" in FIG. 6. However, when the switching level is exceeded, the up counter 53 is disabled by the comparator output (line "d" of FIG. 6), and the counter output is fed into a memory 71 whose input/outputs 72 are tied to the outputs 57 of the counter. In this manner, memory 71 contains the correction offsets for each receiver output at addresses which correspond to the proper receiver outputs.

More specifically, the switching output from the comparator 59 (FIG. 5) which disables the counter 53, also is fed to the parallel/serial input of a shift register delay circuit 78 which jams into the register eight hardwired parallel inputs with the bit pattern 11101111. When the shift register returns to its serial mode, it serially clocks out this bit pattern shown at line "e" of FIG. 6. In turn, the inverting output 80 is tied to the input of an OR gate 82, whose other input is tied to the Q NOT output of an upstream flip flop 84; the output of gate 82 being tied to the write enable input 86 of the memory 71. In this manner, the "0" bit from the shift register 78 delays the writing of the count from counter 53 into memory 71 for three clockings until the counter output has settled. Clocking of the shift register delay circuit 78 is accomplished by a 250 Khz output from a conventional clock 90. This output is also used to clock the up counter 53. In order to prepare for another countup in response to the next receiving transducer output, the counter 53 is reset to zero by the next rising edge output from gate 28.

During calibration, a power up signal to the D input of the flip flop 84 (FIG. 5) is generated by a conventional resistor-capacitor circuit 88 which outputs a logic high during initial power up of the system so that i) Q NOT is low thereby enabling the write enable of memory 71 (when the signal out of the shift register delay 80 is also low), and ii) Q is high, thereby disabling output enable 89 of the memory 71.

The calibration mode is terminated and an operational mode begins when the RC network of the power of circuit charges up thereby causing the Q NOT output of flip flop 84 to go high. This disables the write enable of memory 71 and tristates the outputs 57 of the counter 53. At the same time, the Q output of flip flop 84 goes low thereby enabling the outputs 72 of the memory 71. The Q and Q NOT outputs from flip flop 84 are clocked out by the end of the line (EOL) pulse from the MUX address generator 24. The EOL pulse is active after all of the receiving transducers have been addressed by the multiplexer address generator 24 (FIG. 2).

In the operational mode when sheet material is present in the gap, the correction offset for the current address from the MUX address generator 24 is output from memory 71. From there it is sent to the multiplying DAC 43 where it adjusts the level of the signal from the peak detector to correct the variance for that receiver output in the manner discussed previously.

What is claimed is:

1. Apparatus for determining a first dimension of a workpiece, the apparatus comprising:

a. energy measuring means including (i) a linear array of energy transmitters, and (ii) an opposing linear array of energy receivers which are separated from the transmitters in order to permit the positioning of the workpiece between the transmitters and receivers in a manner such that the energy from the transmitters to at least one of the receivers is blocked by the workpiece and does not reach the receiver, each of the receivers generating an output which is a function of the energy received by that receiver from the transmitters;

b. processing means for processing the outputs from the receivers to (i) determine the number of receivers which receive transmitted energy and (ii) to detect the position of an edge of the workpiece relative to an individual one of the receivers as a function of the amount of the transmitted energy which is received by said individual receiver, said processing means including means for comparing the amount of energy received by the individual receiver to at least one threshold level corresponding to energy receivable by said receiver when blocked to a known partial extent; and c. means connected to said processing means for determining the first dimension of the workpiece as a function of the number of receivers which receive the transmitted energy and the position of the edge of the workpiece relative to the individual receiver.

2. The apparatus as set forth in claim 1 wherein said processing means comprises:

a. means for establishing first, second, and third threshold levels corresponding to the energy receivable by a receiver which is totally unblocked, partially blocked to a known extent, and totally blocked, respectively;

b. means for comparing the level of the transmitted energy received at each receiver with the first, second, and third threshold levels to generate first, second and third signals; and c. means for combining the first, second, and third signals to generate a combined signal representative of the extent of energy blockage for each receiver.

3. The apparatus as set forth in claim 1 wherein said energy transmitters comprise ultrasonic transmitting transducers and said energy receivers comprise ultrasonic receiving transducers.

4. The apparatus of claim 3 wherein said linear array of transmitters comprises a plurality of transducers arranged in side-by-side abutting relationship and wherein said array of receivers comprises a like plurality of ultrasonic receiving transducers arranged in side-by-side abutting relationship, each of said receiving transducers being positioned in aligned opposing relationship to a corresponding one of said plurality of transmitting transducers.

5. The apparatus of claim 4 wherein said processing means further comprises multiplexor means for sequentially reading the outputs of the receiving transducers, gating means for selectively passing only a central portion of each receiver output, and peak detector means for generating a signal proportional to the peak value of the central portion of each output.

6. The apparatus of claim 5, wherein said first dimension extends along a first direction substantially parallel to the linear array of receivers, and further comprising means for determining a second dimension of the workpiece from the receiver outputs, said second dimension extending along a direction substantially orthogonal to said first direction.

7. The apparatus of claim 6 wherein said means for determining said second dimension comprises means for producing relative motion between the workpiece and the opposed arrays of transmitters and receivers along said second direction, and means for determining from the receiver outputs the transit time of the workpiece past said array of receivers.

8. The apparatus of claim 1, further comprising means for automatically adjusting the outputs of the receivers in order to calibrate operation of the receivers, the automatic adjusting means comprising:

a. means for establishing a reference level;

b. means for determining a difference value between the output of each receiver and the reference level when the workpiece is not present between the transmitters and receivers; and c. means for combining the difference values with the corresponding receiver outputs when the workpiece is present between the transmitters and receivers in order to compensate for differences in receiver outputs which are not a function of the blockage of the transmitted energy by the workpiece.

* * * * *